(12) United States Patent
Langerwisch et al.

(10) Patent No.: US 8,479,658 B2
(45) Date of Patent: Jul. 9, 2013

(54) COVERING FOR A BOGIE OF A RAIL VEHICLE AND RAIL VEHICLE HAVING A COVERED BOGIE

(75) Inventors: Stefan Langerwisch, Feldkirchen (AT); Engelbert Rossegger, Kapfenberg (AT); Arnd Rüter, Krefeld (DE); Gerhard Schmidt, Essen (DE); Kaspar Schroeder-Bodenstein, Düsseldorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/146,565

(22) PCT Filed: Jan. 8, 2010

(86) PCT No.: PCT/EP2010/050124
§ 371 (c)(1),
(2), (4) Date: Aug. 23, 2011

(87) PCT Pub. No.: WO2010/086201
PCT Pub. Date: Aug. 5, 2010

(65) Prior Publication Data
US 2011/0297035 A1  Dec. 8, 2011

(30) Foreign Application Priority Data
Jan. 27, 2009  (DE) .......... 10 2009 006 562

(51) Int. Cl.
*B61D 17/00* (2006.01)
(52) U.S. Cl.
USPC .......... 105/1.1; 105/396

(58) Field of Classification Search
USPC .......... 105/1.1, 1.2, 1.3
See application file for complete search history.

(56) References Cited

U.S. PATENT DOCUMENTS

| | | | | | |
|---|---|---|---|---|---|
| 2,098,516 | A | * | 11/1937 | Pflager | 105/1.1 |
| 2,098,517 | A | * | 11/1937 | Pflager | 105/1.1 |
| 2,108,203 | A | * | 2/1938 | Lentz et al. | 105/1.1 |
| 2,256,493 | A | * | 9/1941 | Ragsdale et al. | 105/1.1 |
| 2,266,722 | A | * | 12/1941 | Dean | 105/396 |
| 3,212,453 | A | * | 10/1965 | Lich | 104/124 |
| 5,671,685 | A | * | 9/1997 | Ughi | 105/452 |
| 2009/0095193 | A1 | * | 4/2009 | Roop | 105/1.1 |
| 2011/0297035 | A1 | * | 12/2011 | Langerwisch et al. | 105/1.1 |

FOREIGN PATENT DOCUMENTS

| | | |
|---|---|---|
| DE | 726 181 C | 10/1942 |
| DE | 25 42 780 A1 | 4/1977 |
| JP | 9-226561 A | 9/1997 |

* cited by examiner

*Primary Examiner* — Jason C Smith
(74) *Attorney, Agent, or Firm* — Laurence A. Greenberg; Werner H. Stemer; Ralph E. Locher

(57) ABSTRACT

A covering for a bogie of a rail vehicle lends the entire rail vehicle a low aerodynamic tractive resistance in the region of the bogie. The novel covering has a peripheral wall for surrounding the bogie and a fastening device for rotationally guiding the peripheral wall at the upper edge thereof on a superstructure of the rail vehicle. The covering is covered at the lower edge of the peripheral wall by an underbody-like end member that has fastening means for attaching the same to the bogie.

10 Claims, 2 Drawing Sheets

COVERING FOR A BOGIE OF A RAIL VEHICLE AND RAIL VEHICLE HAVING A COVERED BOGIE

BACKGROUND OF THE INVENTION

Field of the Invention

The aerodynamic tractive resistance to the advancing movement of trains, in particular high speed trains, is determined to a quite significant degree by the aerodynamic tractive resistance. This aerodynamic tractive resistance results to a quite considerable extent from the resistance of the underfloor of the rail vehicle. In order to improve this, it is known in the Italian high speed train ETR 500 to mount aprons laterally on the bogie of the rail vehicle.

BRIEF SUMMARY OF THE INVENTION

The invention is based on the object of reducing even further the aerodynamic tractive resistance of a rail vehicle with a bogie in the region of the underfloor of the rail vehicle.

In order to solve this problem, the invention is based on a covering for a bogie of a rail vehicle and proposes, according to the invention, that the covering has a peripheral wall for engaging around the bogie and an attachment device for rotationally guiding the peripheral wall at its upper edge on a car body of the rail vehicle in such a way that the rotation of the peripheral wall corresponds in each case to the rotation of the bogie; the covering is covered at the lower edge of the peripheral wall by means of a underfloor-like termination part which has attachment means for mounting it on the bogie.

A significant advantage of the present covering consists in the fact that as a full covering which is not only of structurally relatively simple configuration but contributes quite significantly to reducing the aerodynamic tractive resistance of the rail vehicle, this in turn advantageously results in a significant reduction in the energy costs for operating the rail vehicle. Furthermore, the driving power of the rail vehicle can be reduced and therefore the manufacturing costs of the entire rail vehicle can in turn be decreased. In addition to this, the problem of flying gravel and also of falling ice advantageously no longer occurs with such a covering even at very high velocities of the rail vehicle.

The underfloor-like termination part of the covering according to the invention can be mounted on the bogie in different ways; it is considered advantageous if the termination part rests in a spring-mounted fashion on the axle bearings of the bogie (4) and is provided with breakthroughs for individual elements of the bogie. It is advantageous in this embodiment that in this way the termination part can be mounted with comparatively simple means.

In another advantageous embodiment of the covering according to the invention, the termination part is connected to the frame of the bogie. The shape of the underfloor-like termination part can be configured in such a way that only the lower part of the wheels of the bogie project out of the covering, as a result of which a more particularly large reduction in the aerodynamic tractive resistance to advance movement can be achieved. Alternatively, the shape of the underfloor-like termination part can be embodied in such a way that it runs above the wheels and the brake disks in the region thereof and that the latter are located outside the covering.

Investigations have shown that it is advantageous within the scope of the invention if relatively small gaps are present between the peripheral wall of the bogie and the termination part.

However, it is particularly advantageous if sealing elements are provided between the lower edge of the peripheral wall and the termination part. In this case, an embodiment of the covering according to the invention which is particularly favorable in terms of flow is obtained. The sealing elements are advantageously embodied here as bellows, in particular single-corrugation bellows.

The covering according to the invention can be configured in a particularly favorable way in terms of flow if it is provided on both sides, with respect to the longitudinal direction of the bogie, with an outwardly curved end wall, and the region between the end wall and the peripheral wall is sealed in the downward direction.

The invention also relates to a rail vehicle having a car body and at least one bogie on the car body, and having a covering of the inventive type and provides, according to the invention, that a protective body is provided adjacent to each end wall on the car body. This protective body is advantageously embodied as a protective wall and prevents the covering from being damaged during travel.

BRIEF DESCRIPTION OF THE SEVERAL VIEWS OF THE DRAWING

In order to explain the invention further.

DESCRIPTION OF THE INVENTION

Figure 1:
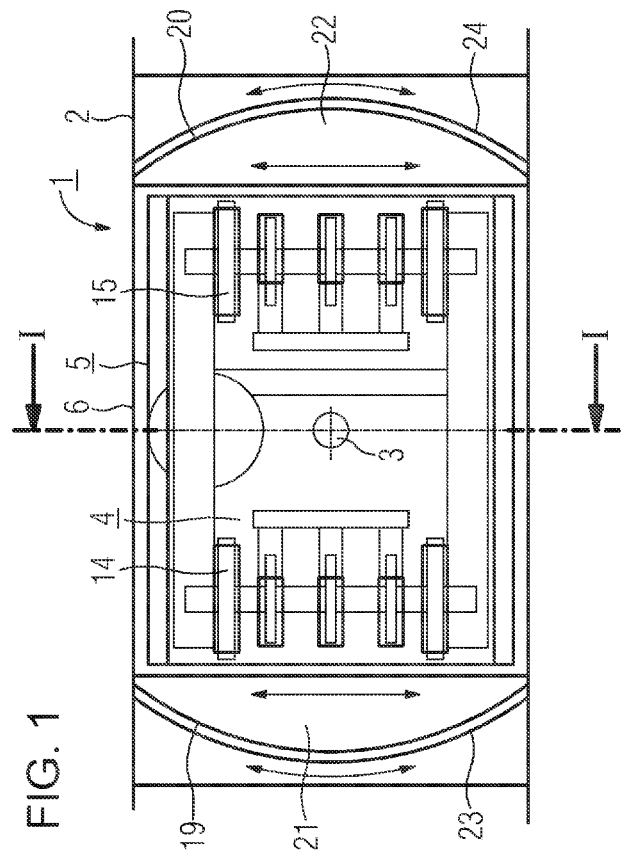
FIG. 1 is a schematic view of a rail vehicle with an exemplary embodiment of the covering according to the invention in a plan view.

FIG. 1 is a schematic illustration of a rail vehicle 1 which has a car body 2 which is also illustrated only schematically.

A bogie 4, which is also illustrated only schematically, is mounted on the car body 2 so as to be rotatable about a vertical axis 3. The bogie 4 is covered with a covering 5 which has a peripheral wall 6. The peripheral wall 6 completely encloses the bogie 4 laterally while forming a rectangle in the embodiment according to FIG. 1, that is to say engages completely around said bogie 4 on all sides. The peripheral wall 6 can be terminated at its upper edge 7 with a piece of sheet metal 8 with the exception of openings for the rotatable mounting of the bogie, and said peripheral wall 6 can be rotatably guided by means of this piece of sheet metal 8 on the car body 2. Other rotatable guides of this peripheral wall 6 on the car body 2 are also possible, wherein an attachment device for the peripheral wall 6 is not shown in FIGS. 1 to 4 for the sake of better clarity. The rotation of the peripheral wall 6 takes place along with the rotation of the bogie 4.

Figure 2:
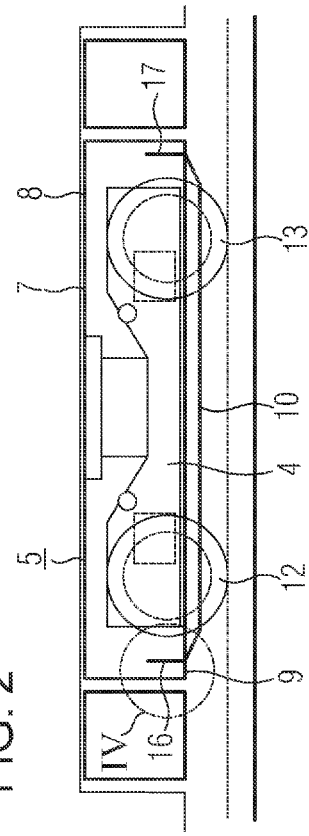
FIG. 2 shows a side view of the same exemplary embodiment.
Figure 3:
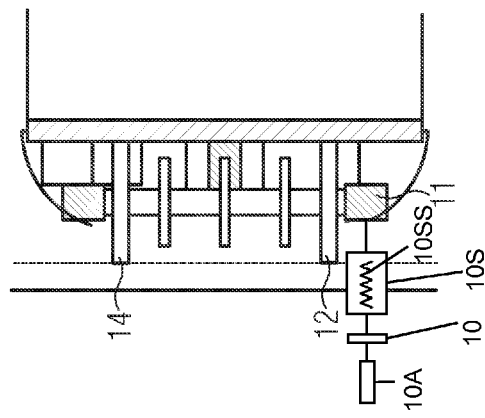
FIG. 3 shows a section along the line I-I in FIG. 1.

As is apparent, in particular, from FIG. 2, in which parts which correspond to those according to FIG. 1 are provided with the same reference symbols, the covering 5 is covered at the bottom or at the lower edge 9 of the peripheral wall 6 by means of a termination part 10. This termination part 10 is, as is shown in particular in FIG. 3, secured to the axle bearing 11 by means attachment devices 10a of a suspension system 10s including springs 10ss. As a result of this, not only do wheels 12 and 13 as well as 14 and 15 but also the brake disks, transmission elements etc, protrude downward out of the termination part 10.

Figure 4:
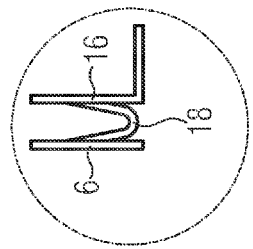
FIG. 4 shows an enlarged detail A from FIG. 2.
Figure 5:
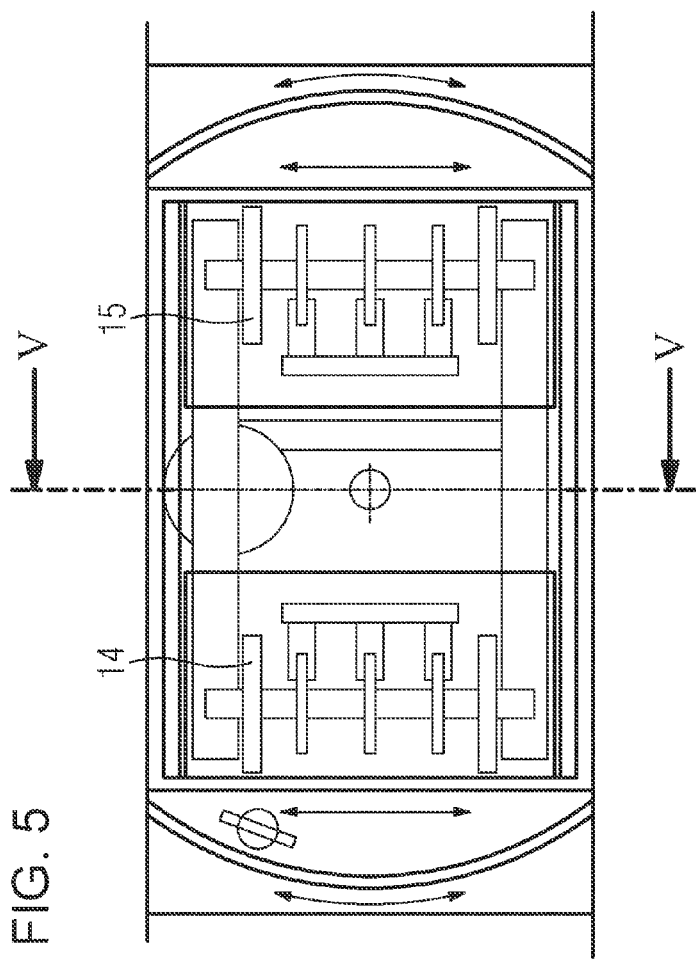
FIG. 5 shows a plan view of a further exemplary embodiment of a covering for a bogie of a rail vehicle in a schematic illustration.
Figure 6:
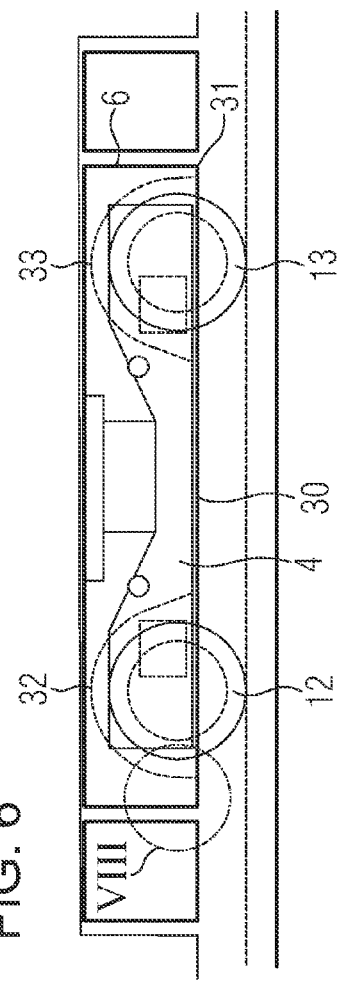
FIG. 6 shows a side view of the exemplary embodiment according to FIG. 5.
Figure 7:
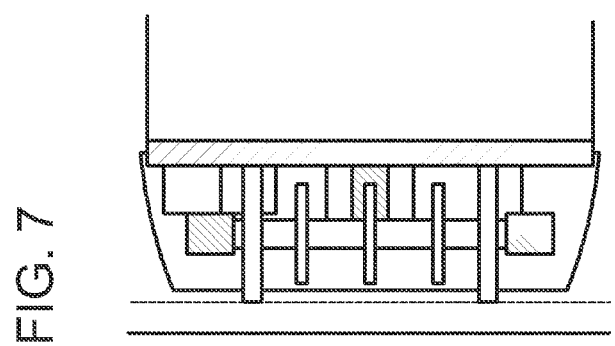
FIG. 7 shows a section along the line V-V in FIG. 5.
Figure 8:
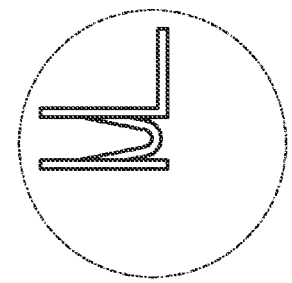
FIG. 8 shows an enlarged detail B from FIG. 6.
Figure 1:
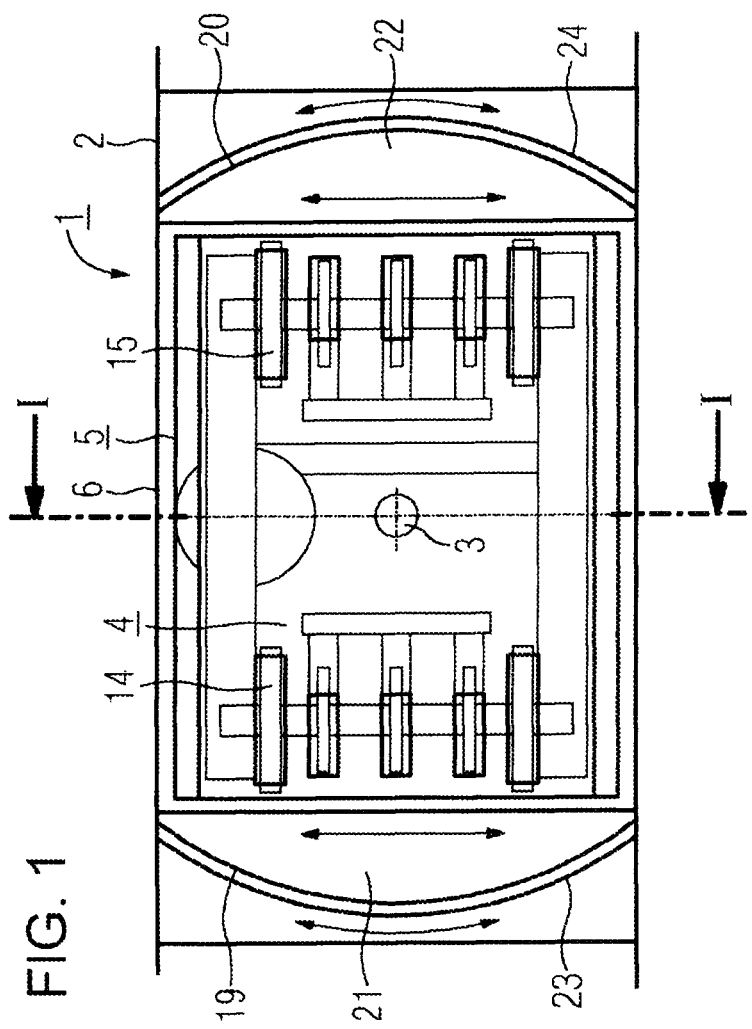
Figure 2:
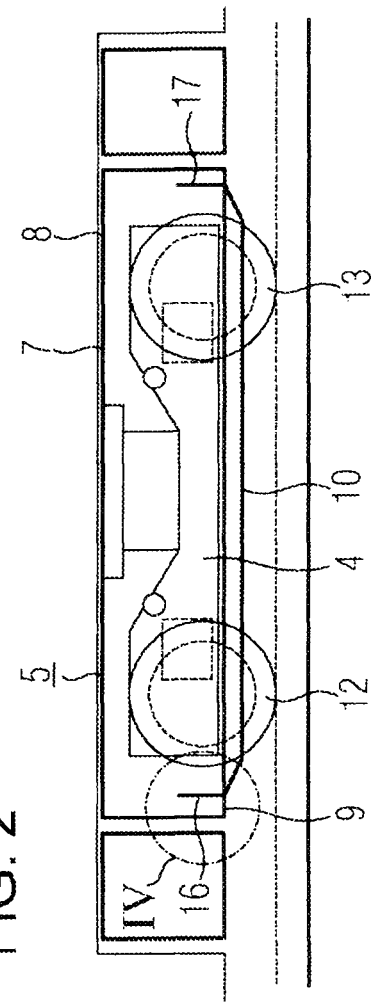
Figure 3:
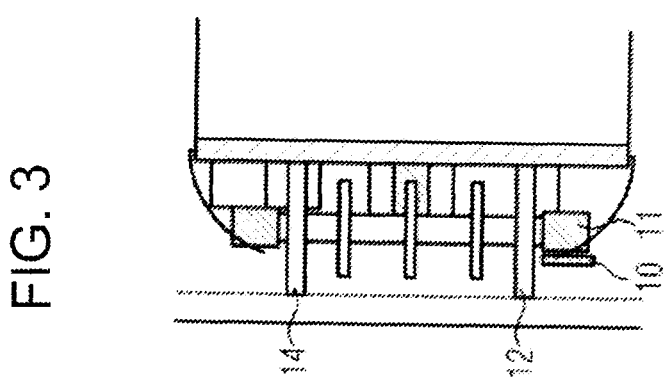
Figure 4:
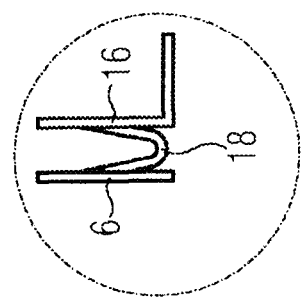

As is also shown by FIG. 2, and therefore also in conjunction FIG. 4, the termination part 10 is bent upward at its ends lying in the longitudinal direction of the bogie 4 and therefore has bent ends 16 and 17 which run parallel to the peripheral wall 6 there. For the purpose of providing the seal, a sealing element in the form of a single-corrugation or multi-corrugation bellows 18 is provided, as shown in FIG. 4, between the peripheral wall 6 and the bent end 16. As is apparent also, in particular, from FIG. 1, the covering 5 is provided on both sides, with respect to the longitudinal direction of the bogie, with an outwardly curved end wall 19, 20, and the region between the end wall 19, 20 and the peripheral wall 6 is sealed in the downward direction. A protective body 23 or 24 is provided on the car body 2, parallel to the outwardly curved end walls 19 and 20.

The further exemplary embodiment of the covering according to the invention which is illustrated in FIGS. 5 to 8, for a bogie of a rail vehicle, corresponds in many ways to the exemplary embodiment illustrated in FIGS. 1 to 4, and in FIGS. 5 to 8 elements which correspond to the exemplary embodiment according to FIGS. 1 to 4 are therefore provided with the same reference symbols. In contrast to the exemplary embodiment according to FIGS. 1 to 4, in the exemplary embodiment according to FIGS. 5 to 8 an underfloor-like termination part 30 for closing off the peripheral wall 6 is attached to the bogie frame 4. As a result of the termination part 30 being secured in the region of the bogie 4, the termination part 30 can be arranged higher than in the exemplary embodiment according to FIGS. 1 to 4, with the result that only the wheels 12 to 15 then protrude downwards somewhat from the entire covering 5, as a result of which the aerodynamic tractive resistance is particularly low in the region of the bogie.

In both embodiments in the connection to the axle bearing or to the bogie frame, the underfloor-like termination part can extend over the wheels in a curving fashion as a mud-flap-like region 32 and 33.

The invention claimed is:

1. A covering for a bogie of a rail vehicle, the covering comprising:
a peripheral wall for engaging around the bogie and an attachment device for rotationally guiding said peripheral wall at an upper edge thereof on a car body of said rail vehicle such that a rotation of said peripheral wall, by means of a termination part connected to an axle of the rail vehicle, corresponds in each case to a rotation of the bogie; and
said peripheral wall having a lower edge; and
said termination part covering said peripheral wall at said lower edge and having attachment devices for mounting said termination part on the bogie.

2. The covering according to claim 1, wherein said termination part is spring-mounted to rest on axle bearings of the bogie and said termination part is formed with breakthroughs for individual elements of the bogie.

3. The covering according to claim 2, wherein said termination part is formed to extends over wheels and brake disks of the bogie with curves forming mud-flap-type regions.

4. The covering according to claim 1, wherein the bogie has a frame and said termination part is connected to the frame of the bogie.

5. The covering according to claim 1, which comprises sealing elements between said lower edge of said peripheral wall and said termination part.

6. The covering according to claim 5, wherein said sealing elements are single-corrugation bellows.

7. The covering according to claim 5, wherein said sealing elements are multi-corrugation bellows.

8. The covering according to claim 1, wherein the bogie has a longitudinal direction and the covering is formed on both ends of the bogie, with respect to the longitudinal direction, with an outwardly curved end wall, and wherein a region between said a respective said end wall and said peripheral wall is sealed in a downward direction.

9. A rail vehicle, comprising: the covering according to claim 1, said covering having outwardly curved end walls; at least one bogie supporting said car body; and a protective body on said car body disposed adjacent each of said outwardly curved end walls.

10. The rail vehicle according to claim 9, wherein said protective body is a protective wall.

* * * * *

UNITED STATES PATENT AND TRADEMARK OFFICE
CERTIFICATE OF CORRECTION

PATENT NO. : 8,479,658 B2
APPLICATION NO. : 13/146565
DATED : July 9, 2013
INVENTOR(S) : Stefan Langerwisch et al.

It is certified that error appears in the above-identified patent and that said Letters Patent is hereby corrected as shown below:

Delete drawing sheet 1, and substitute the attached drawing sheet therefor.

Signed and Sealed this
Twelfth Day of November, 2013

Teresa Stanek Rea
*Deputy Director of the United States Patent and Trademark Office*